United States Patent
Yoshida et al.

(10) Patent No.: US 11,294,355 B2
(45) Date of Patent: Apr. 5, 2022

(54) CONTROL DEVICE AND CONTROL METHOD

(71) Applicant: FANUC CORPORATION, Yamanashi (JP)

(72) Inventors: Kouei Yoshida, Yamanashi (JP); Yousuke Koyanaka, Yamanashi (JP); Takahiro Omori, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 82 days.

(21) Appl. No.: 17/011,429

(22) Filed: Sep. 3, 2020

(65) Prior Publication Data
US 2021/0103272 A1 Apr. 8, 2021

(30) Foreign Application Priority Data

Oct. 4, 2019 (JP) .............................. JP2019-183517

(51) Int. Cl.
*G05B 19/4155* (2006.01)
(52) U.S. Cl.
CPC ............... *G05B 19/4155* (2013.01); *G05B 2219/34013* (2013.01)
(58) Field of Classification Search
None
See application file for complete search history.

(56) References Cited

U.S. PATENT DOCUMENTS

| 2020/0285220 A1* | 9/2020 | Saijo | G05B 19/41 |
| 2021/0116877 A1* | 4/2021 | Pan | G05B 19/409 |

FOREIGN PATENT DOCUMENTS

JP 2010-252615 11/2010

* cited by examiner

*Primary Examiner* — Ryan A Jarrett
(74) *Attorney, Agent, or Firm* — Wenderoth, Lind & Ponack, L.L.P.

(57) ABSTRACT

A control device includes a program analysis unit, a program execution unit, and a servo control unit. The program analysis unit includes a machining/non-machining state determination unit that determines whether a target block of a machining program is in a machining state or a non-machining state, a switching necessity determination unit that determines whether it is necessary to perform switching of a control target axis of the target block and/or switching of an electrical current control cycle, and an information adding unit that adds a switching request and information after switching to an analysis result of the target block. The program execution unit includes a switching execution unit that executes the switching of the control target axis of the target block and/or the switching of the electrical current control cycle. The servo control unit controls the control target axis at the switched electrical current control cycle.

5 Claims, 9 Drawing Sheets

FIG. 3

| COMMAND INCLUDED IN BLOCK ||  STATE DETERMINATION RESULT |
|---|---|---|
| MACHINING AXIS (X, Z) | NON-MACHINING AXIS (U, W) | |
| CUTTING FEED | NO COMMAND | MACHINING STATE |
| CUTTING FEED | CUTTING FEED | NON-MACHINING STATE |
| CUTTING FEED | CUTTING FEED | NON-MACHINING STATE |
| NO COMMAND | CUTTING FEED | NON-MACHINING STATE |
| NO COMMAND | CUTTING FEED | NON-MACHINING STATE |
| CUTTING FEED | NO COMMAND | THE SAME STATE AS PREVIOUS BLOCK |
| NO COMMAND | NO COMMAND | THE SAME STATE AS PREVIOUS BLOCK |

| MACHINING PROGRAM 50 | PROGRAM ANALYSIS UNIT 110 | | | PROGRAM EXECUTION UNIT 120 |
|---|---|---|---|---|
| | MACHINING/NON-MACHINING STATE DETERMINATION UNIT 112 | SWITCHING NECESSITY DETERMINATION UNIT 114 | INFORMATION ADDING UNIT 115 | SWITCHING EXECUTION UNIT 121 |
| N100 G00 X10. Z10. U10. W10. | NON-MACHINING STATE | UNNECESSARY TO PERFORM SWITCHING | NOTHING | NOTHING |
| N100 G00 X20. Z20. U20. W20. | NON-MACHINING STATE | UNNECESSARY TO PERFORM SWITCHING | NOTHING | NOTHING |
| N102 M1000 (INDEPENDENT OF AXIAL OPERATION) | NON-MACHINING STATE | UNNECESSARY TO PERFORM SWITCHING | NOTHING | NOTHING |
| N103 M1001 (INDEPENDENT OF AXIAL OPERATION) | NON-MACHINING STATE | UNNECESSARY TO PERFORM SWITCHING | NOTHING | NOTHING |
| N104 G01 X30. Z30. | MACHINING STATE | NECESSARY TO SWITCH TO MACHINING STATE | ADD SWITCHING REQUEST TO MACHINING STATE AND INFORMATION AFTER SWITCHING | SWITCH TO CONTROL TARGET AXIS AND CURRENT CONTROL CYCLE OF MACHINING STATE |

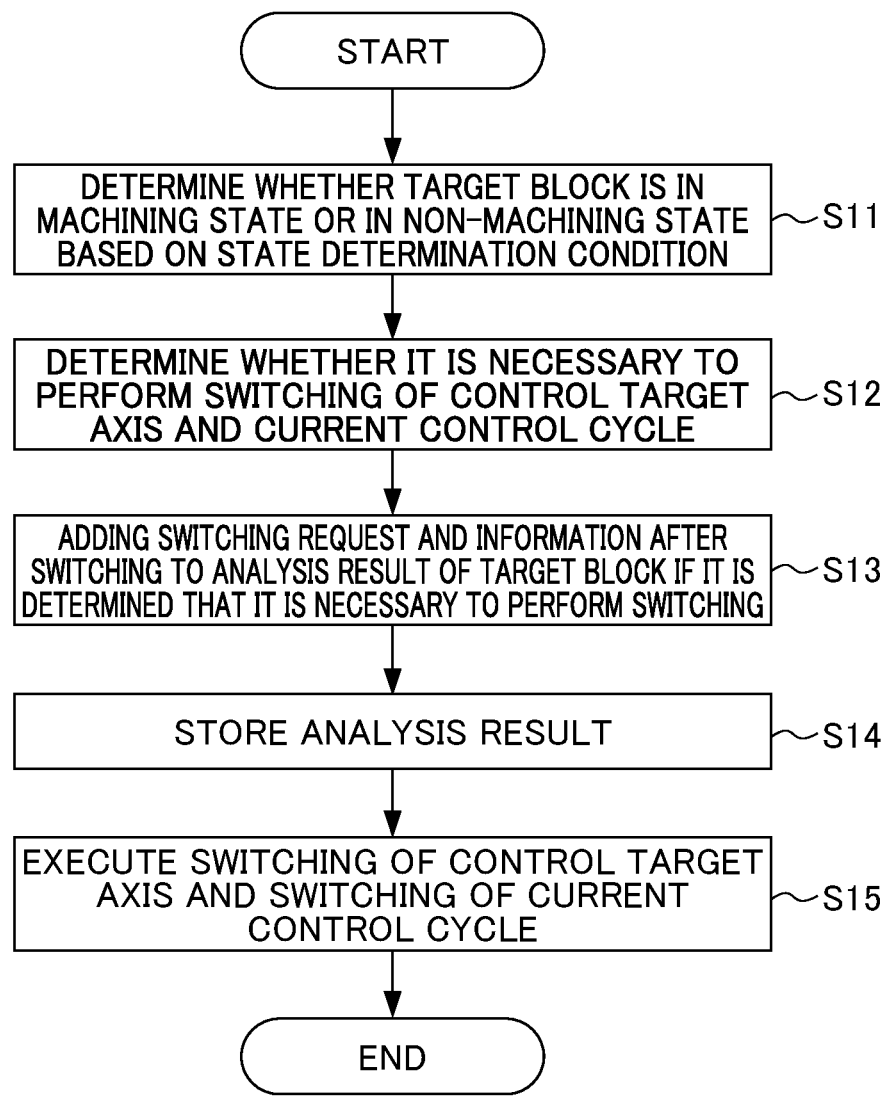

FIG. 8

| MACHINING PROGRAM 50 | PROGRAM ANALYSIS UNIT 110 | | | | | PROGRAM EXECUTION UNIT 120 |
|---|---|---|---|---|---|---|
| | MACHINING/NON-MACHINING STATE DETERMINATION UNIT 112 | SWITCHING NECESSITY DETERMINATION UNIT 114 | SWITCHING POSSIBILITY DETERMINATION UNIT 117 | SWITCHING EXECUTION BLOCK DETERMINATION UNIT 118 | INFORMATION ADDING UNIT 115a | SWITCHING EXECUTION UNIT 121 |
| N100 G00 X10. Z10. U10. W10. | NON-MACHINING STATE | UNNECESSARY TO PERFORM SWITCHING | IMPOSSIBLE | NOTHING | NOTHING | NOTHING |
| N100 G00 X20. Z20. U20. W20. | NON-MACHINING STATE | UNNECESSARY TO PERFORM SWITCHING | IMPOSSIBLE | NOTHING | NOTHING | NOTHING |
| N102 M1000 (INDEPENDENT OF AXIAL OPERATION) | NON-MACHINING STATE | UNNECESSARY TO PERFORM SWITCHING | POSSIBLE | NOTHING | NOTHING | SWITCHING TO CONTROL TARGET AXIS AND CURRENT CONTROL CYCLE OF MACHINING STATE |
| N103 M1001 (INDEPENDENT OF AXIAL OPERATION) | NON-MACHINING STATE | UNNECESSARY TO PERFORM SWITCHING | POSSIBLE | NOTHING | NOTHING | NOTHING |
| N104 G01 X30. Z30. | MACHINING STATE | NECESSARY TO SWITCH TO MACHINING STATE | IMPOSSIBLE | DETERMINE SWITCHING TO MACHINING STATE AT BLOCK OF N102 | ADD SWITCHING REQUEST TO MACHINING STATE AND INFORMATION AFTER SWITCHING TO ANALYSIS RESULT OF N102 | NOTHING |

CONTROL DEVICE AND CONTROL METHOD

This application is based on and claims the benefit of priority from Japanese Patent Application No. 2019-183517, filed on 4 Oct. 2019, the content of which is incorporated herein by reference.

BACKGROUND OF THE INVENTION

Field of the Invention

The present invention relates to a control device and a control method.

Related Art

A control device for controlling an industrial machine has a processor (hereinafter also referred to as "servo control CPU") for controlling a plurality of servo motors which drive each of a plurality of control axes included in the industrial machine. Furthermore, with one servo control CPU, in order to drive each of the plurality of control axes of the industrial machine, a technique of controlling each of the plurality of servo motors for each predetermined control cycle is known. For example, refer to Patent Document 1.

Patent Document 1: Japanese Unexamined Patent Application, Publication No. 2010-252615

SUMMARY OF THE INVENTION

However, the load of one servo control CPU increases as the number of servo motors which are control targets increases. It should be noted that, even when a servo motor is stopped, as long as the servo motor is a control target, a load is applied to a servo control CPU in order to execute the data transfer processing of the servo motor, and the like.

In addition, the load of the servo control CPU increases as the electrical current control cycle for exchanging the current control for the servo motor with the servo amplifier and the current feedback for the current control becomes shorter. Furthermore, by shortening the electrical current control cycle, although machining performance is improved, since the number of times to be processed increases, the load of the servo control CPU increases.

Such an increase in load is a factor of an unauthorized operation depending on the processing capacity of the servo control CPU.

From this point of view, conventionally, a servo control CPU has been selected that has a high processing capacity that can cope even if it operates under a condition that (1) all control axes are always set as control targets, and (2) the electrical current, control cycle is fixed (if it is necessary to operate with a short electrical current control cycle at any time, a short electrical current control cycle is always set). However, in the operation of the actual control axis, for example, since a movement command is not outputted to the control axis for workpiece conveyance during machining, it is not necessary to always set all the control axes to be control targets by, for example, excluding the control axis from the control target. Furthermore, it may be unnecessary to always keep the same electrical current control cycle by, for example, setting a short electrical current control cycle only during machining and setting a long electrical current control cycle in other cases.

Therefore, it has been considered to reduce the load of the CPU by switching the control axis of the control target (hereinafter, also referred to as "control target axis") and/or the electrical current control cycle, and to select a servo control CPU having a processing capacity that can cope with the maximum load after the reduction. In this case, the switching of the control target axis and the electrical current control cycle depends on what kind of operation command is to be issued; however, depending on the reducing effect, the processing capacity and cost of the servo control CPU to be selected can be reduced as compared with the case of the abovementioned selection method. However, since the control target axis and/or the electrical current control cycle are manually set according to parameters, it may take time and effort in the switching.

Therefore, it is desired to suppress the maximum load of a servo control CPU by automatically switching the control target axis and the electrical current control cycle, and to reduce the hardware cost of the servo control CPU.

One aspect according to the present disclosure relates to a control device that controls each of a plurality of control axes included in an industrial machine based on a machining program, the control device comprising: at least a program analysis unit; a program execution unit; and a servo control unit, wherein the program analysis unit includes: a machining/non-machining state determination unit that determines whether a target block as an analysis target of the machining program is in a machining state which causes the industrial machine to perform a machining operation, or in a non-machining state which causes the industrial machine to perform a non-machining operation other than machining, based on a state determination condition that is set in advance; a state storage unit that stores a determination result determined by the machining/non-machining state determination unit; a switching necessity determination unit that, in a case in which a state of the target block determined by the machining/non-machining state determination unit is identical to a state of a block one before the target block stored in the state storage unit, determines that it is unnecessary to perform switching of a control target axis which is the control axis of a control target and/or switching of an electrical current control cycle with respect to the control target axis, and in a case in which the state of the target block is different from the state of the block one before the target block, determines that it is necessary to perform the switching of the control target axis and/or the electrical current control cycle; an information adding unit that, in a case in which the switching necessity determination unit determines that it is necessary to perform the switching, adds a switching request and information after switching indicating a state after switching to an analysis result of the target block; and an analysis result storage unit that stores the analysis result, wherein the program execution unit includes a switching execution unit that executes the switching of the control target axis and/or the switching of the electrical current control cycle upon execution of the target block with respect to the servo control unit based on data of the control target axis and the electrical current control cycle in the machining state and the non-machining state, and the analysis result of the target block, and wherein the servo control unit controls the control target axis at the electrical current control cycle switched by the switching execution unit.

One aspect according to the present disclosure relates to a control method for controlling each of a plurality of control axes in an industrial machine based on a machining program, the method being realized by a computer and comprising the steps of: at least performing program analysis; performing program execution; and performing servo control, wherein the performing program analysis includes: a machining/non-machining state determination step of determining whether a target block as an analysis target of the machining program is in a machining state which causes the industrial machine to perform a machining operation, or in a non-machining state which causes the industrial machine to perform a non-machining operation other than machining, based on a state determination condition that is set in advance; a state storage step of storing a determination result determined in the machining/non-machining state determination step; a switching necessity determination step of, in a case in which a state of the target block determined in the machining/non-machining state determination step is identical to a state of a block one before the target block stored in the state storage step, determining that it is unnecessary to perform switching of a control target axis which is the control axis of a control target and/or switching of an electrical current control cycle with respect to the control target axis, and in a case in which the state of the target block is different from the state of the block one before the target block, determining that it is necessary to perform the switching of the control target axis and/or the electrical current control cycle; an information adding step of, in a case in which the switching necessity determination step determines that it is necessary to perform the switching, adding a switching request and information after switching indicating a state after switching to an analysis result of the target block; and an analysis result storage step of storing the analysis result, wherein the program execution step includes a switching execution step of executing the switching of the control target axis and/or the switching of the electrical current control cycle upon execution of the target block based on data of the control target axis and the electrical current control cycle in the machining state and the non-machining state, and the analysis result of the target block, and wherein the servo control step controls the control target axis at the electrical current control cycle switched in the program execution step.

According to one aspect, it is possible to suppress the maximum load of the servo control CPU by automatically switching the control target axis and the electrical current control cycle, and thus it is possible to reduce the hardware cost of the servo control CPU.

BRIEF DESCRIPTION OF THE DRAWINGS

FIG. 3 is a table showing an example of state determination conditions;

FIG. 4 is a diagram showing an example of a machining program;

FIG. 5 is a table showing an example of the relationship between each block of the machining program of FIG. 4 and the operations of a machining/non-machining state determination unit, a switching necessity determination unit, an information adding unit, and a switching execution unit;

FIG. 6 is a flowchart for explaining switching processing of the control device;

FIG. 8 shows an example of the relationship between each block of the machining program in FIG. 4 and the operations of a machining/non-machining state determination unit, a switching necessity determination unit, a switching possibility determination unit, an execution block determination unit, an information adding unit, and a switching execution unit.

DETAILED DESCRIPTION OF THE INVENTION

First Embodiment

First, an outline of the present embodiment will be described. In the present embodiment, a control device determines whether a target block as an analysis target of the machining program is in a machining state which causes the industrial machine to perform a machining operation, or in a non-machining state which causes the industrial machine to perform a non-machining operation other than machining, and stores a determination result determined. The control device determines, in a case in which a state of the target block determined is identical to a state of a block one before the target block stored, that it is unnecessary to perform switching of a control target axis and/or switching of an electrical current control cycle, and determines, in a case in which the state of the target block is different from the state of the block one before the target block, that it is necessary to perform the switching of the control target axis and/or the electrical current control cycle. The control device adds, in a case in which it is determined that it is necessary to perform the switching, a switching request and information after switching indicating a state after switching to an analysis result of the target block, and stores the analysis result. The control device executes the switching of the control target axis and/or the switching of the electrical current control cycle upon execution of the target block based on data of the control target axis and the electrical current control cycle in the machining state and the non-machining state, and the analysis result of the target block, and controls the control target axis at the electrical current control cycle switched.

With such a configuration, according to the present embodiment, it is possible to solve the object of "to suppress the maximum load of a servo control CPU by automatically switching a control target axis and an electrical current control cycle, and to reduce hardware cost of the servo control CPU".

The outline of the present embodiment is described above.

Next, a detailed description will be given of the configuration of the present embodiment with reference to the drawings.

Figure 1:
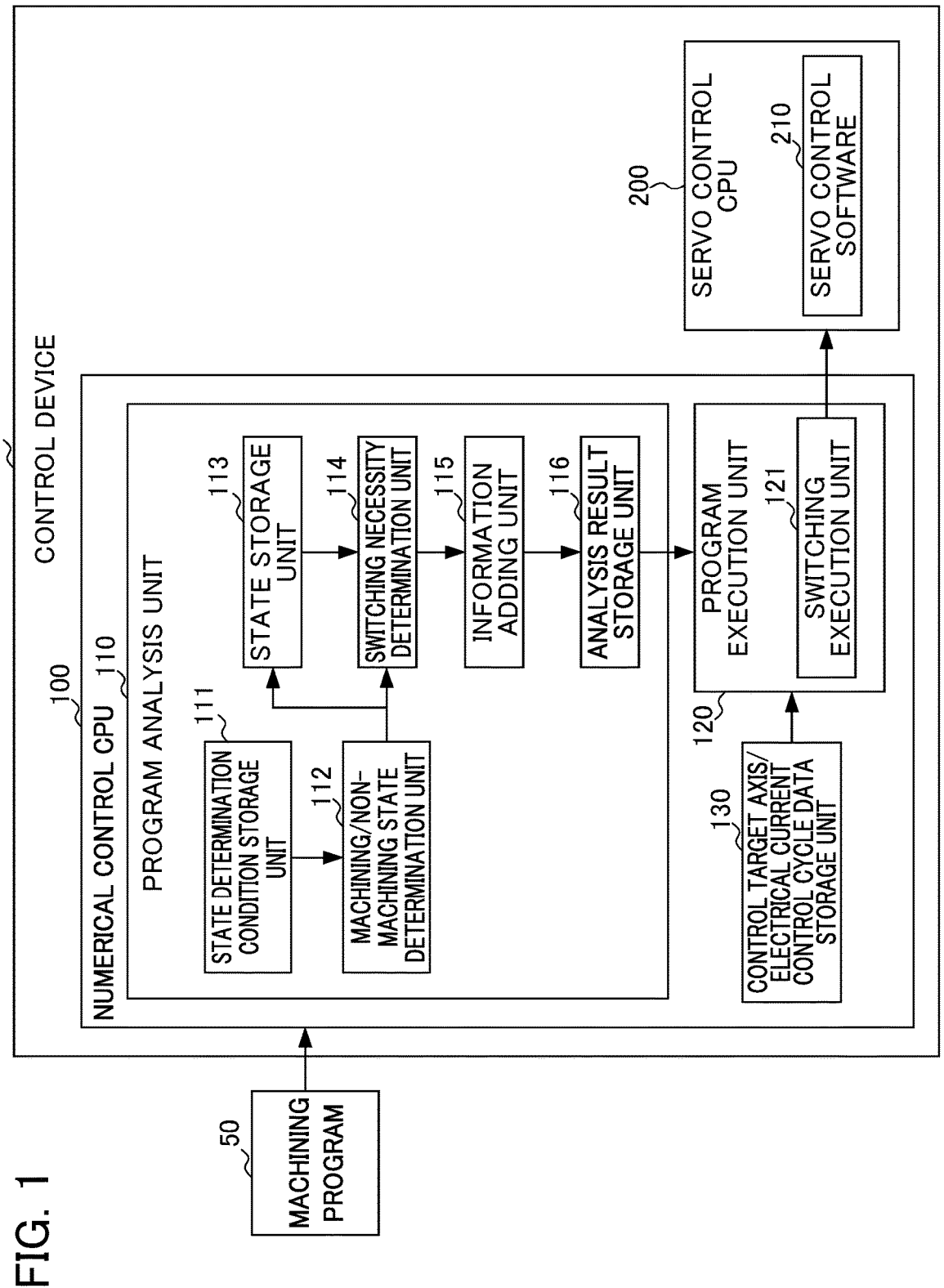
FIG. 1 is a functional block diagram showing an example of the functional configuration of a control device according to the first embodiment.

FIG. 1 is a functional block diagram showing an example of the functional configuration of a control device 1 according to the first embodiment.

The control device 1 is a numerical control device known to those skilled in the art, generates an operation command based on the control information, and outputs the generated operation command to a machine tool (not shown). Thus, the control device 1 controls the operation of the machine tool (not shown). It should be noted that, in a case in which the machine tool (not shown) is a robot or the like, the control device 1 may be a robot control device or the like.

The control device 1 may be directly connected to the machine tool (not shown) via a connection interface (not shoran). It should be noted that the control device 1 and the machine tool (not shown) may be connected to each other via a network (not shown) such as a local area network (LAN) and the Internet. In this case, the control device 1 includes a communication unit (not shown) for performing communication with each other by such a connection.

Here, the machine tool (not shown) is, for example, a machine tool, a robot, a peripheral device or the like. It should be noted that the machine tool (not shown) is not limited to a machine tool, a robot, or a peripheral device, and can be widely applied to industrial machines in general. The industrial machines include, for example, machine tools, industrial robots, service robots, forging machines and injection molding machines.

It should be noted that, among the plurality of control axes included in the machine tool (not shown) according to the first embodiment, a control axis that is controllable with a short electrical current control cycle only during machining (for example, cutting feed or the like) and controllable with a longer electrical current control cycle than the cycle during machining during operation other than machining is set as "machining axis". On the other hand, a control axis that is controllable with a constantly long electrical current control cycle in all operations including the cycle during machining, or a control axis that can be set as being out of the control target in a case of the cycle during machining is set as "non-machining axis".

Furthermore, for each of the plurality of control axes, in the setting of the machining axis or non-machining axis, it is necessary to set the machining axis or the non-machining axis so that the cutting feed command of the machining axis and the rapid traverse/cutting feed command of the non-machining axis are not performed at the same time.

Furthermore, as described later, in order to operate the machine tool (not shown), the control target axis and/or the electrical current control cycle of each of the plurality of control axes is switched depending on whether each block included in the machining program executed by the control device 1 is in a machining state or in a non-machining state.

Figure 2:
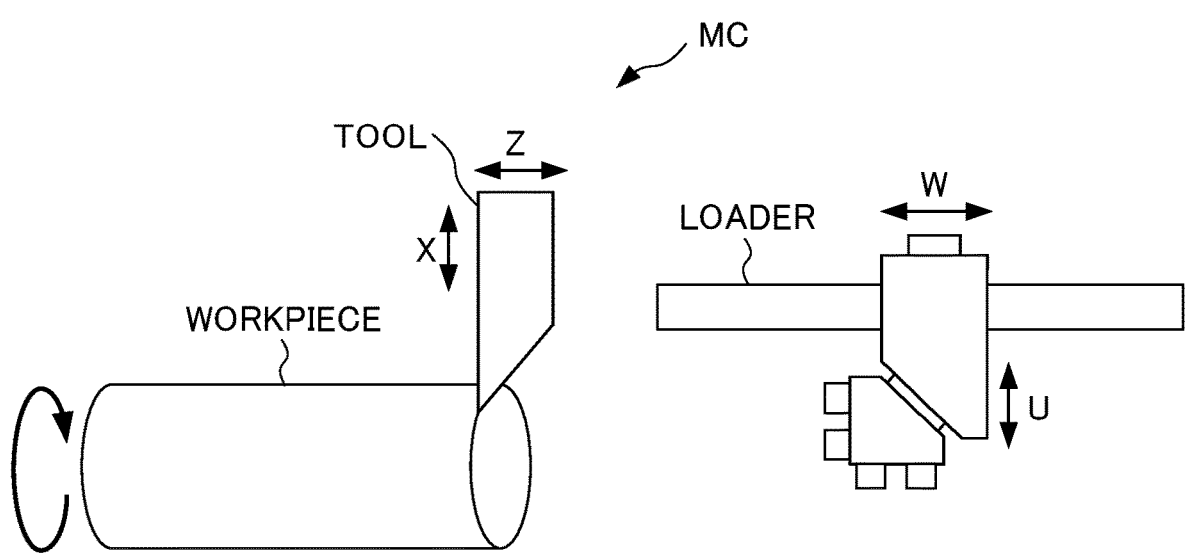
FIG. 2 is a diagram showing an example of a machine tool according to the first embodiment.

FIG. 2 is a diagram showing an example of a machine tool MC according to the first embodiment.

As shown in FIG. 2, the machine tool MC according to the first embodiment is, for example, a lathe or the like having X and Z axes which are axes of a turret, and U and W axes which are loader axes for workpiece conveyance or the like. Furthermore, in the machine tool MC, it is possible to set the X and Z axes as the machining axes, and the U and W axes as the non-machining axes so that the cutting feed command of the machining axis and the rapid traverse/cutting feed command of the the non-machining axes are not performed at the same time.

As shown in FIG. 1, the control device 1 includes a numerical control CPU 100 and a servo control CPU 200. The numerical control CPU 100 and the servo control CPU 200 are communicably connected via a bus.

<Numerical Control CPU 100>

The numerical control CPU 100 is a processor that entirely controls the control device 1. The numerical control CPU 100 is connected via a bus so as to be able to communicate with memory such as RAM and ROM (not shown).

The numerical control CPU 100 reads the system program and the application program stored in the memory (not shown) via the bus, and controls the entire control device 1 in accordance with the system program and the application program. Thus, as shown in FIG. 1, the numerical control. CPU 100 is configured to realize the functions of a program analysis unit 110, a program execution unit 120, and a control target axis/electrical current control cycle data storing unit 130. Furthermore, the program analysis unit 110 is configured to realize the functions of a state determination condition storage unit 111, a machining/non-machining state determination unit 112, a state storage unit 113, a switching necessity determination unit 114, an information adding unit 115, and the analysis result storage unit 116. Furthermore, the program execution unit 120 is configured to realize the function of the switching execution unit 121.

For example, the program analysis unit 110 acquires a machining program 50 generated by an external device such as a CAD/CAM device, and analyzes the acquired machining program 50 for each block.

The state determination condition storage unit 111 stores a state determination condition that is set in advance in order for the machining/non-machining state determination unit 112, which will be described later, to determine whether the target block of the machining program 50 is in the machining state or in the non-machining state.

FIG. 3 is a diagram showing an example of the state determination condition. It should be noted that, similarly to the machine tool MC of FIG. 2, the control axes of the X and Z axes are set as machining axes, and the control axes of the U and W axes are set as non-machining axes in advance in the state determination condition. Furthermore, the state determination condition is applied to the machine tool MC or the like shown in FIG. 2 in which the assumption is established in that the cutting feed command of the machining axis and the rapid traverse/cutting feed command of the non-machining axis are not performed simultaneously.

As shown in FIG. 3, in a case in which the command of the machining axis is "cutting feed" and the command of the non-machining axis is "no command" in a target block, the state determination condition is "machining state" as a state determination result of the block. In addition, in a case in which the command of the machining axis is "rapid traverse" and the command of the non-machining axis is "cutting feed", in a case in which the command of the machining axis is "rapid traverse" and the command of the non-machining axis is "rapid traverse", in a case in which the command of the machining axis is "no command." and the command of the non-machining axis is "cutting feed", or in a case in which the command of the machining axis is "no command" and the command of the non-machining axis is "rapid traverse", the state determination condition is "non-machining state" as a state determination result of the block.

It should be noted that, in a case in which the command of the machining axis is "rapid traverse" and the command of the non-machining axis is "no command", or in a case in which the command of the machining axis is "no command" and the command of the non-machining axis is "no command" in the target block, the state determination condition is "the same state as the previous block" as a state determination result of the block. That is, the target block to be determined as "the same state as the previous block" may be the control target axis and the electrical current control cycle of either the machining state or the non-machining state. Furthermore, since it is advantageous to avoid executing the switching processing by the switching execution unit 121 of the program execution unit 120, which will be described later, in terms of processing time, the state determination condition is "the same state as the previous block".

The machining/non-machining state determination unit 112 performs a determination, for example, based on the state determination condition in which whether the target block of an analysis target of the machining program 50 is in the machining state or in the non-machining state is set in advance.

FIG. 4 is a diagram showing an example of the machining program 50.

FIG. 4 shows five blocks from the sequence number N100 to the sequence number N104 in the machining program 50. The blocks of the sequence numbers N100 and N101 perform rapid traverse of the X and Z axes of the machining axes and the U and P axes of the non-machining axes, respectively. The blocks of sequence numbers N102 and N103 perform processing that is set in advance as "M1000" and "M1001", e.g., the processing independent of the operations of the X and Z axes as the machining axes and the U and W axes as the non-machining axis. The block of sequence number N104 performs the cutting feed with respect to the X and Z axes as the machining axes.

For example, in a case in which the blocks of the sequence numbers N100 and N101 of the machining program 50 are the target blocks, since the X and Z axes of the machining axes and the U and W axes of the machining axes are rapid traverse, respectively, the machining/non-machining state determination unit 112 determines that the target blocks are in "the non-machining state" based on the above-described state determination condition. Furthermore, in a case in which the blocks of the sequence numbers N102 and N103 of the machining program 50 are the target blocks, due to being independent of the operations of the X and Z axes of the machining axes and the U and P axes of the non-machining axes, the machining/non-machining state determination unit 112 determines that the target blocks are in "the same state as the previous block", i.e., in "the non-machining state".

On the other hand, in a case in which the block of the sequence number N104 of the machining program 50 is the target block, since the X and Z axes of the machining axes are subjected to cutting feed, and there is no command with respect to the U and W axes of the non-machining axes, the machining/non-machining state determination unit 112 determines that the target block is in "machining state".

Thereafter, the machining/non-machining state determination unit 112 outputs the determination result of the target block to the state storage unit 113 and the switching necessity determination unit 114.

The state storage unit 113 stores the determination result determined by the machining/non-machining state determination unit 112.

In a case in which the state of the target block determined by the machining/non-machining state determination unit 112 is the same as the state of the previous block which is one before the target block stored in the state storage unit 113, the switching necessity determination unit 114 determines that it is unnecessary to perform the switching of the control target axis and/or the electrical current control cycle. Furthermore, in a case in which the state of the target block and the state of the previous block are different, the switching necessity determination unit 114 determines that it is necessary to perform the switching of the control target axis and/or the electrical current control cycle.

For example, the blocks of the sequence numbers from N100 to N103 of the machining program 50 in FIG. 4 are determined as the same "non-machining state" by the machining/non-machining state determination unit 112. Therefore, the switching necessity determination unit 114 determines that it is unnecessary to perform the switching with respect to the target blocks of the sequence numbers from N100 to N103.

On the other hand, the block of the sequence number N104 is determined as the "machining state" by the machining/non-machining state determination unit 112. In this case, since the "machining state" of the target block of the sequence number N104 differs from the "non-machining state" of the previous block of the sequence number N103, the switching necessity determination unit 114 determines that it is necessary to perform the switching with respect to the target block of the sequence number N104.

In a case in which it is necessary to perform the switching by the switching necessity determination unit 114, the information adding unit 115 adds a switching request and the information after switching indicating the state after switching (i.e. information indicating whether the state after switching is the machining state or the non-machining state) to the analysis result of the target block.

More specifically, in the case of the machining program 50 of FIG. 4, if the switching necessity determination unit 114 determines that it is necessary to perform switching with respect to the target block of the sequence number N104, the information adding unit 115 adds the switching request and the information after switching (machining state) to the analysis result of the target block of the sequence number N104.

The analysis result storage unit 116 stores the analysis result of each block including the analysis result to which the switching request and the state after switching are added.

The program execution unit 120 sequentially executes each block (target block) of the machining program 50 based on, for example, the analysis result of the machining program 50 by the program analysis unit 110.

It should be noted that, in a case in which the switching execution unit 121, which will be described later, executes the switching processing of the control target axis and the electrical current control cycle of the target block, the program execution unit 120 executes the processing of the target block after the switching processing is completed. In other words, the program execution unit 120 does not execute the processing of the target block until the switching processing is completed.

The switching execution unit 121 executes the switching of the control target axis and/or the switching of the electrical current control cycle for the execution of the target block with respect to the servo control CPU 200, which will be described later, based on the data of the control target axis and the electrical current control cycle in the machining state and the non-machining state stored in the control target axis/electrical current control cycle data storage unit 130, which will be described later, and the analysis result of the target block.

More specifically, the switching execution unit 121 sequentially acquires the analysis result of the target block from the analysis result storage unit 116 of the program analysis unit 110, and determines whether the switching request and the information after switching are added to the acquired analysis result. In a case in which the switching request and the information after switching are added to the analysis result, the switching execution unit 121 transmits the data of the control target axis and the electrical current control cycle of the state indicated by the information after switching to the servo control CPU 200.

It should be noted that, although a description will be given of a case of the switching execution unit 121 executing the switching of the control target axis and the switching of the electrical current control cycle with respect to the servo control CPU 200, the same applies to the case of executing the switching of the control target axis and the switching or electrical current control cycle.

The control target axis/electrical current control cycle data storage unit 130 stores the data of the control target axis and the electrical current control cycle in each of the machining state and the non-machining state that are set in advance.

More specifically, in the data of the control target axis and the electrical current control cycle of the machining state, for example, the X and Z axes of the machining axes of the machine tool MC in FIG. 2 are set as the control target axes, and the U and W axes of the non-machining axes are set as being outside the control target. In this case, for the electrical current control cycle with respect to the X and Z axes as the control target axes, a cycle shorter than the electrical current control cycle in the case of the non machining state is set, in which the quality required in the machining processing of the machining program 50 is guaranteed.

On the other hand, in the data of the control target axis and the electrical current control cycle of the non-machining state, all of the X and Z axes of the machining axes and the U and W axes of the non-machining axes of the machine tool MC of FIG. 2 are set as the control target axes. In this case, for the electrical current control cycle with respect to the control target axis, a cycle longer than the electrical current control cycle in the case of the machining state for the non-machining processing such as rapid traverse is set.

As described above, the operation of each element of the control device 1 is summarized as shown in FIG. 5.

FIG. 5 is a diagram showing an example of the relationship between each block of the machining program 50 of FIG. 4 and the operations of the machining/non-machining state determination unit 112, the switching necessity determination unit 114, the information adding unit 115, and the switching execution unit 121.

As shown in FIG. 5, in the machining program 50 of FIG. 4, by the machining/non-machining state determination unit 112 determining that the target block of the sequence number N104 is in "the machining state", the switching necessity determination unit 114 determines that it is necessary to perform the switching to the machining state with respect to the target block of the sequence number N104. Thereafter, the information adding unit 115 adds the switching request and the information after switching to the analysis result of the target block of the sequence number N104, and the switching execution unit 121 executes the switching of the control target axis and the switching of the electrical current control cycle.

For example, in such a case, it is possible to reduce the hardware cost of the servo control CPU 200. For example, in a case in which there is a low-performance and low-cost CPU that can control four control target axes at the time of a long electrical current control cycle, and can control two control target axes at the time of a short electrical current control cycle, and a high-performance and high-cost CPU that can control the four control target axes at the time of the long electrical current control cycle, and can control two control target axes at the time of the short electrical current control cycle and two control target axes at the time of the long electrical current control cycle at the same time, the control device 1 can select the low-performance and low-cost CPU as a servo control CPU 200.

Furthermore, owing to the switching of the control target axis and the switching of the electrical current control cycle, the maximum load of the servo control CPU 200 can be suppressed by adjusting the number of the control target axes and the interval of the electrical current control cycle.

<Servo Control CPU 200>

The servo control CPU 200 is a processor that comprehensively controls four servo motors (not shown) that drive the control axes of the X, Z, U, and W axes respectively included in the machine tool MC. The servo control CPU 200 is connected so as to enable the communication with the numerical control CPU 100 and memory such as ROM and PRAM via a bus.

The servo control CPU 200 reads the application programs of the servo control software 210 stored in the memory (not shown) via the bus. The servo control CPU 200 controls the servo motor (not shown) of the control target axis according to the servo control software 210 thus read and the control target axis and the electrical current control cycle switched by the switching execution unit 121.

<Switching Processing of Control Unit 1>

Next, the operation of the control device 1 according to the first embodiment related to the switching processing will be described.

FIG. 6 is a flowchart for explaining the switching processing of the control device 1. The flow shown here is repeatedly executed every time the control device 1 acquires the machining program 50.

In Step S11, the machining/non-machining state determination unit 112 determines whether the target block is in the machining state or the non-machining state based on the state determination condition stored in the state determination condition storage unit 111.

In Step S12, the switching necessity determination unit 114 determines whether it is necessary to perform switching of the control target axis and the electrical current control cycle based on the state of the target block determined in Step S11 and the state of the previous block which is one before the target block stored in the state storage unit 113. That is, in a case in which the state of the target block determined in Step S11 is the same as the state of the previous block, the switching necessity determination unit 114 determines that it is unnecessary to perform the switching of the control target axis and the electrical current control cycle. Furthermore, in a case in which the state of the target block differs from the state of the previous block, the switching necessity determination unit 114 determines that it is necessary to perform the switching of the control target axis and the electrical current control cycle.

In Step S13, in a case in which it is determined that it is necessary to perform the switching in Step S12, the information adding unit 115 adds the switching request and the information after switching to the analysis result of the target block.

In Step S14, the analysis result storage unit 116 stores the analysis result of each block including the analysis result to which the switching request and the state after switching are added.

In Step S15, the switching execution unit 121 executes the switching of the control target axis and the switching of the electrical current control cycle for the execution of the target block with respect to the servo control CPU 200 based on the data of the control target axis and the electrical current control cycle in the machining state and the non-machining state and the analysis result of the target block.

As described above, the control device 1 according to the first embodiment determines whether the target block of the machining program 50 is in the machining state or the non-machining state based on the state determination condition that is set in advance. The control device 1 determines whether it is necessary to perform the switching of the control target axis and the electrical current control cycle based on the state of the target block and the state of the previous block which is one before the target block, and in a case in which it is determined that it is necessary to perform the switching, the control device 1 adds the switching request and the information after switching to the analysis result of the target block. The control device 1 executes the switching of the control target axis and the switching of the electrical current control cycle for the execution of the target block with respect to the servo control CPU 200 based on the data of the switching request and the information after the switching added to the analysis result of the target block. The control device 1 causes the servo control CPU 200 to control the control target axis in the switched electrical current control cycle.

With such a configuration, since the control device 1 automatically performs the switching of the control target axis and the electrical current control cycle, it is possible to suppress the maximum load of the servo control CPU 200, and hence it is possible to reduce the hardware cost of the servo control CPU 200.

The first embodiment has been described above.

Second Embodiment

A control device 1A according to the second embodiment further has a function of looking ahead a plurality of target blocks of the machining program, and determining whether or not to include the operation of the control axis in each of the plurality of target blocks thus looked ahead, thereby determining whether it is possible to perform, in a target block, the switching of the control target axis and/or the switching of the electrical current control cycle in a block after the target block. Furthermore, the control device 1A further has a function of determining a block for executing the switching of the control target axis and/or the switching of the electrical current control cycle in the target block for which it is determined that it is necessary to perform the switching.

With such a configuration, it is possible for the control device 1A to suppress an increase in cycle time due to the standby time until the switching processing of the control target axis and the electrical current control cycle of the target block is completed.

A second embodiment will be described below.

Figure 7:
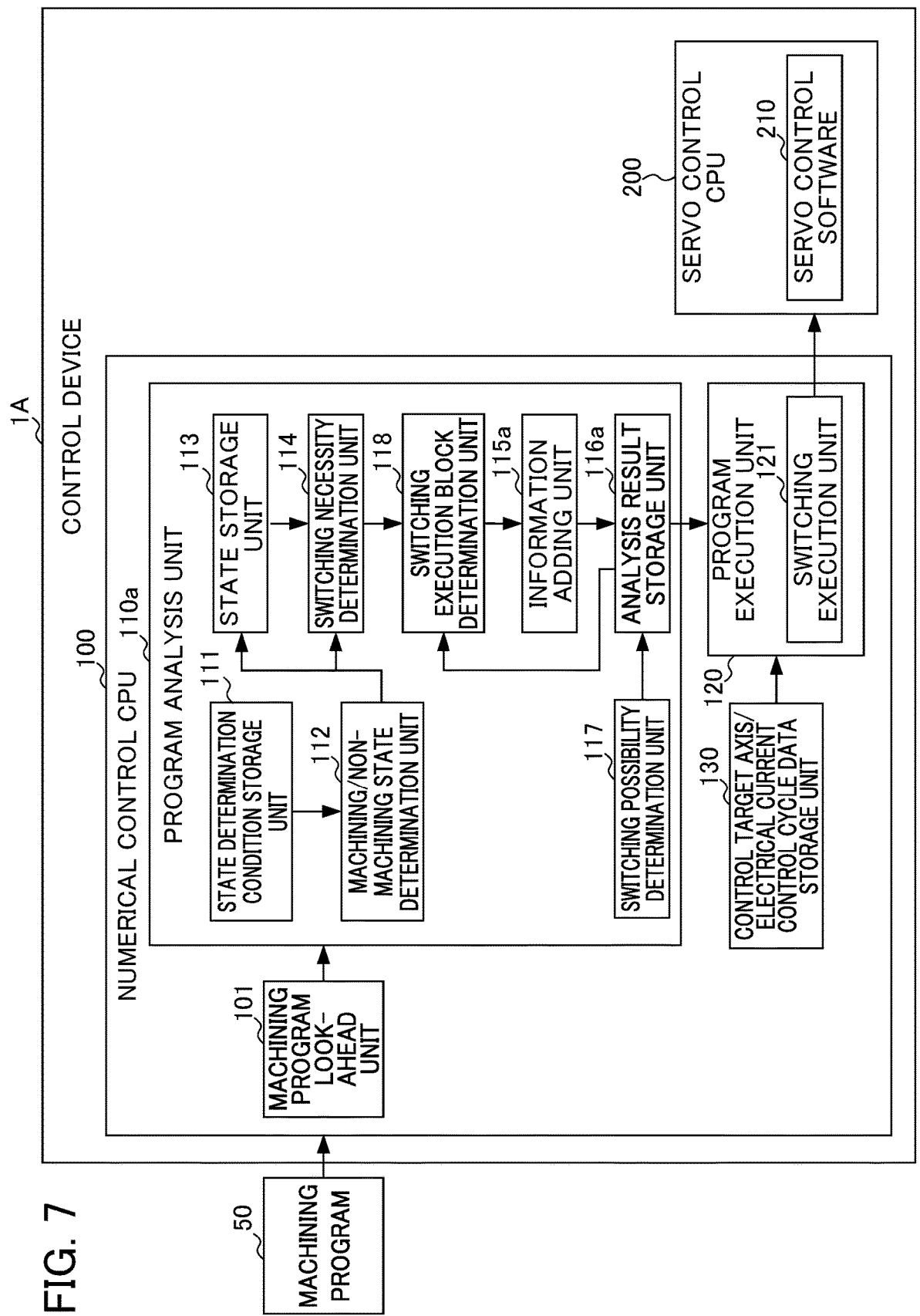
FIG. 7 is a functional block diagram showing an example of a functional configuration of a control device according to the second embodiment.

FIG. 7 is a functional block diagram showing an example of the functional configuration of a control device according to the second embodiment. The elements having the same functions as those of the control device 1 in FIG. 1 are denoted by the same reference numerals, and a detailed description thereof is omitted.

The control device 1A according to the second embodiment includes a numerical control CPU 100 and a servo control CPU 200, similarly to the control device 1 according to the first embodiment.

The numerical control CPU 100 is configured to realize the functions of a machining program look-ahead unit 101, a program analysis unit 110a, a program execution unit 120, and a control target axis/electrical current control cycle data storage unit 130. Furthermore, the program analysis unit 110a is configured to realize the functions of a state determination condition storage unit 111, a machining/non-machining state determination unit 112, a state storage unit 113, a switching necessity determination unit 114, an information adding unit 115a, an analysis result storage unit 116a, a switching possibility determination unit 117, and the switching execution block determination unit 118.

The machining program look-ahead unit 101 looks ahead a plurality of target blocks of the machining program 50. The machining program look-ahead unit 101 outputs the plurality of target blocks thus looked ahead to the program analysis unit 110a.

The state determination condition storage unit 111, the machining/non-machining state determination unit 112, the state storage unit 113, and the switching necessity determination unit 114 have the same functions as the state determination condition storage unit 111, the machining/non-machining state determination unit 112, the state storage unit 113, and the switching necessity determination unit 114 of the first embodiment.

The switching possibility determination unit 117 determines whether it is possible to execute the switching of the control target axis and/or the switching of the electrical current control cycle in a block after a target block in each of the plurality of target blocks that is looked ahead by the machining program look-ahead unit 101.

For example, in the machining program 50 of FIG. 4, the blocks of the sequence numbers N100 and N101 perform rapid traverse of the X and Z axes of the machining axes and the U and W axes of the non-machining axes, respectively. That is, the blocks of the sequence numbers N100 and N101 include the operation commands of the X and Z axes of the machining axes and the U and W axes of the non-machining axes, respectively. Therefore, the switching possibility determination unit 117 determines that it is not possible to perform the switching of the control target axis and the switching of the electrical current control cycle in a subsequent block in the blocks (the target blocks) of the sequence numbers N100 and N101, i.e. determines that it is "impossible".

On the other hand, the blocks of sequence numbers N102 and N103 perform processing as "M1000" and "M1001", e.g., the processing independent of the operations of the X and Z axes as the machining axes and the U and U axes as the non-machining axes. That is, the blocks of the sequence numbers N102 and N103 do not include the operation commands of the X and Z axes of the machining axes and the U and W axes of the non-machining axes. Therefore, the switching possibility determination unit 117 determines that it is possible to perform the switching of the control target axis and the switching of the electrical current control cycle in a subsequent block in the blocks (the target blocks) of the sequence numbers N102 and N103, i.e., determines that it is "possible".

Furthermore, the block of sequence number N104 performs the cutting feed with respect to the X and Z axes as the machining axes. That is, the block of the sequence number N104 includes the operation commands of the X and Z axes of the machining axes. Therefore, the switching possibility determination unit 117 determines that it is not possible to perform the switching of the control target axis and the switching of the electrical current control cycle in a subsequent block in the block (the target block) of the sequence number N104, i.e., determines that it is "impossible". Thereafter, the switching possibility determination unit 117 stores the determination result for each target block as switching possibility information in the analysis result storage unit 116a.

The switching execution block determination unit 118 determines a block for executing the switching of the control target axis and/or the switching of the electrical current control cycle in the target block for which it is determined that it is necessary to perform the switching based on the determination result by the switching possibility determination unit 117 (switching possibility information), the switching necessity determination unit 114.

More specifically, in the machining program 50 of FIG. 4, as described above, the switching necessity determination unit 114 determines that it is necessary to switch the target block of the sequence number N104. In this case, the switching execution block determination unit 118 determines whether it is possible to perform the switching of the control target axis and the switching of the electrical current control cycle in the target block of the sequence number N104 in the block of the sequence number N103 which is one before the target block of the sequence number N104, based on the switching possibility information of the analysis result storage unit 116a. Since it is determined that the block of the sequence number N103 is "possible" in the switching possibility information, the switching execution block determination unit 118 determines that it is "possible" to perform the switching of the control target axis and the switching of the electrical current control cycle in the target block of the sequence number N104 in the block of the sequence number N103.

In a case in which it is determined that the block of the sequence number N103 is "possible", the switching execution block determination unit 118 determines whether it is possible to perform the switching of the control target axis and the switching of the electrical current control cycle in the target block of the sequence number N104 in the block of the sequence number N102 which is two before the target block. Since it is determined that the block of the sequence number N102 is "possible" in the switching possibility information, the switching execution block determination unit 118 determines that it is "possible" to perform the switching or the control target axis and the switching of the electrical current control cycle in the target block of the sequence number N104 in the block of the sequence number N102. Furthermore, in a case in which it is determined that the block of the sequence number N102 is "possible", the switching execution block determination unit 118 determines whether it is possible to perform the switching of the control target axis and the switching of the electrical current control cycle in the target block of the sequence number N104 in the block of the sequence number N101 which is three before the sequence number N104. Since it is determined that the block of the sequence number N101 is "impossible" in the switching possibility information, the switching execution block determination unit 118 determines that it is "impossible" to perform the switching of the control target axis and the switching of the electrical current control cycle in the target block of the sequence number N104 in the block of the sequence number N101. As a result, the switching execution block determination unit 118 determines that the block of the sequence number N102 is a block for executing the switching of the control target axis and the switching of the electrical current control cycle in the target block of the sequence number N104.

In this way, the switching execution block determination unit 118 executes the switching of the control target axis and the electrical current control cycle of the target block in the previous block as much as possible. That is, it is possible for the control device 1A to execute the processing of the block of the sequence number N104 without delay by executing the processing of the block of the sequence number N102 and the switching processing for the target block of the sequence number N104 in parallel. Thus, it is possible for the control device 1A to suppress an increase in the cycle time.

It should be noted that, in a case in which it is determined that the block of the sequence number N103 is "impossible", the switching execution block determination unit. 118 determines that the block of the sequence number N104 is a block for performing the switching of the control target axis and the switching of the electrical current control cycle in the target block of the sequence number N104.

The information adding unit 115a adds, for example, the switching request and the information after switching in the target block of the sequence number N104 to the analysis result of the block of the sequence number N102 determined by the switching execution block determination unit 118.

The analysis result storage unit 116a stores the switching possibility information of the switching possibility determination unit 117 together with the analysis result of each block including the analysis result to which the switching request and the state after the switching are added.

As described above, the operations of the respective elements of the control device 1A are summarized as shown in FIG. 8.

FIG. 8 is a diagram showing an example of the relationship between each block of the machining program 50 of FIG. 4 and the operations of the machining/non-machining state determination unit 112, the switching necessity determination unit 114, the switching possibility determination unit 117, the switching execution block determination unit 118, the information adding unit 115a, and the switching execution unit 121.

As shown in FIG. 8, in the machining program 50 of FIG. 4, the machining/non-machining state determination unit 112 determines that the target block of the sequence number 112 is in "the machining state", whereby the switching necessity determination unit 114 determines that it is necessary to perform the switching to the machining state for the target block of the sequence number N104. Thereafter, the switching execution block determination unit 118 determines that the block of the sequence number N102 is subjected to the execution of the switching processing of the control target axis and the electrical current control cycle of the target block of the sequence number N104 based on the switching possibility information by the switching possibility determination unit 117. The information adding unit 115a adds the switching request and the information after switching to the machining state in the target block of the sequence number N104 to the analysis result of the block of the sequence number N102. The switching execution unit 121 executes the switching of the control target axis and the switching of the electrical current control cycle in the block of the sequence number N102.

With such a configuration, it is possible for the control device 1A to execute the processing of the block of the sequence number N104 without delay by executing the processing of the block of the sequence number N102 and the switching processing for the target block of the sequence number N104 in parallel. Furthermore, it is possible for the control device 1A to suppress an increase in the cycle time.

<Switching Processing of Control Unit 1A>

Next, the operation relating to the switching processing of the control device 1A according to the second embodiment will be described.

Figure 9:
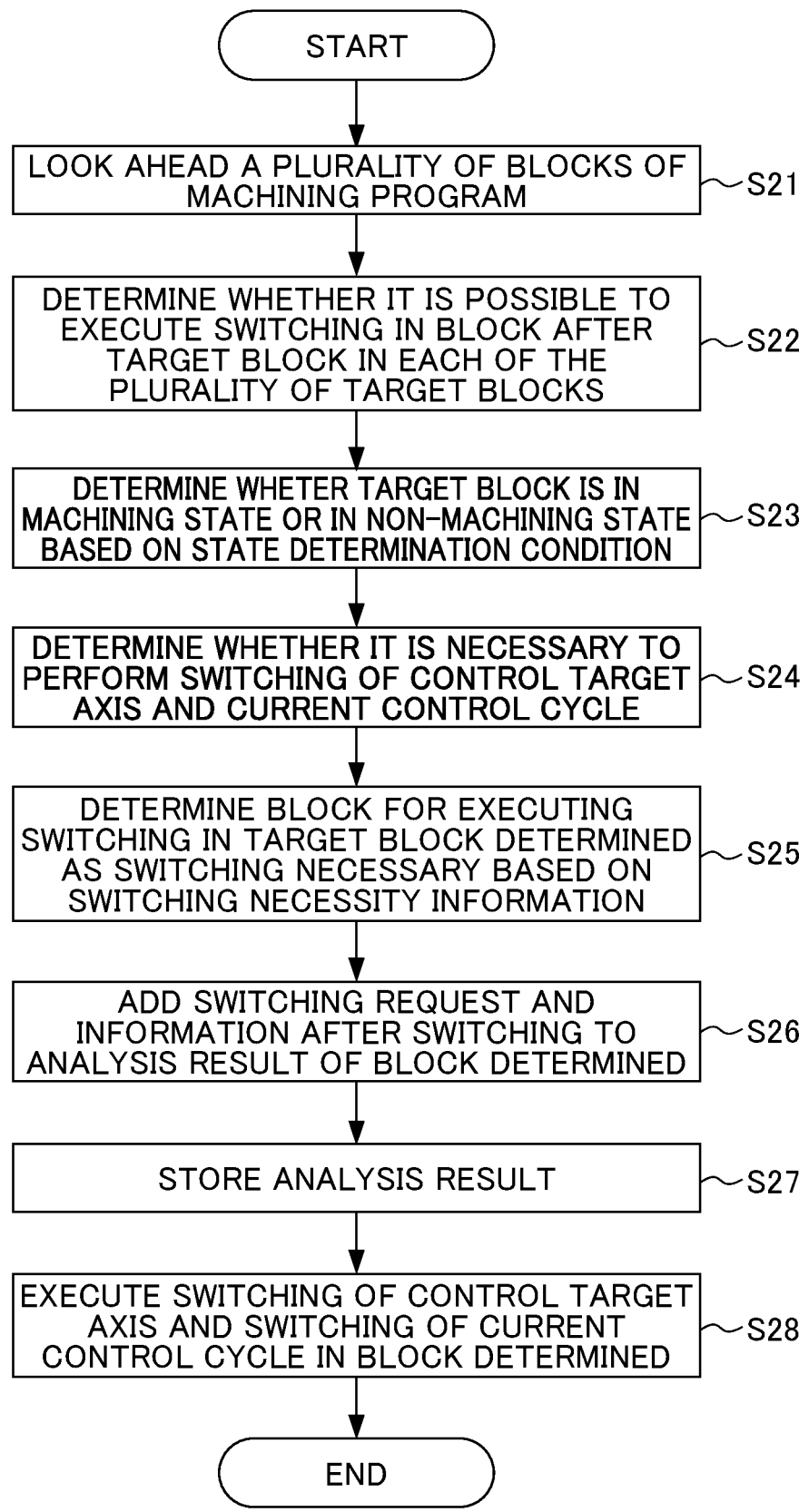
FIG. 9 is a flowchart for explaining switching processing of the control device.

FIG. 9 is a flowchart showing the switching processing of the control device 1A. The flow shown here is repeatedly executed every time the control device 1A acquires the machining program 50.

It should be noted that, in the servo control processing shown in FIG. 9, the processing in Steps S23, S24, and S27 is the same as the processing in Steps S11, S12, and S14 in FIG. 6, and thus description thereof is omitted.

In Step S21, the machining program look-ahead unit 101 looks ahead a plurality of target blocks.

In Step S22, the switching possibility determination unit 117 determines whether it is possible to execute the switching of the control target axis and the switching of the electrical current control cycle in a block after a target block in each of the plurality of target blocks thus looked ahead in Step S21. Thereafter, the switching possibility determination unit 117 stores the switching possibility information of the determination result in the analysis result storage unit 116a.

In Step S25, the switching execution block determination unit 118 determines a block for executing the switching of the control target axis and the switching of the electrical current control cycle axis in the target block for which it is determined that it is necessary to perform the switching in Step S24, based on the switching possibility information determined in Step S22

In Step S26, the information adding unit 115a adds the switching request and the information after switching of the target block for which it is determined that it is necessary to perform the switching in Step S24 to the analysis result of the block determined in step S25.

In Step S28, the switching execution unit 121 executes the switching of the control target axis and the switching of the electrical current control cycle for the execution of the target block with respect to the servo control CPU 200 in the block determined in Step S25, based on the data of the control target axis and the electrical current control cycle in the machining state and the non-machining state of the control target axis/electrical current control cycle data storage unit 130, and the analysis result.

The processing of Step S22 and the processing of Steps S23 and S24 are processed in series; however, these may be processed in parallel.

As described above, the control device 1A according to the second embodiment looks ahead a plurality of target blocks of the machining program 50. The control device 1A determines whether it is possible to execute the switching of the control target axis and the switching of the electrical current control cycle in a block after a target block in each of the plurality of target blocks thus looked ahead, and stores it as the switching possibility information. The control device 1A determines a block for executing the switching of the control target axis and the switching of the electrical current control cycle in the target block for which it is determined that it is necessary to perform the switching based on the switching possibility information, and adds the switching request and the information after switching of the target block for which it is determined that it is necessary to perform the switching to the analysis result of the block thus determined. The control device 1A executes the switching of the control target axis and the switching of the electrical current control cycle for the execution of the target block with respect to the servo control CPU 200 in the block thus determined, based on the switching request and the information after switching added to the analysis result of the block. The control device 1A causes the servo control CPU 200 to control the control target axis at the switched electrical current control cycle.

With such a configuration, it is possible for the control device 1A to suppress the maximum load of the servo control CPU 200 by automatically switching the control target axis and the electrical current control cycle, thereby reducing the hardware cost of the servo control CPU 200.

Furthermore, by executing the switching of the control target axis and the switching of the electrical current control cycle in the block before the target block, it is possible for the control device 1A to suppress an increase in cycle time.

The second embodiment has been described above.

Although the first embodiment and the second embodiment have been described above, the control devices 1 and 1A are not limited to the embodiments described above, and include modifications, improvements, and the like of an extent that can achieve the object.

Modification Example 1

In the first embodiment and the second embodiment described above, the machine tool MC of FIG. 2 is, for example, a lathe or the like having X and Z axes which are axes (machining axes) of a turret and the U and U axes which are loader axes (non-machining axes) for workpiece conveyance or the like; however, the present invention is not limited thereto. For example, the machine tool MC may have the three machining axes of the Y axis as well as the X and Z axes. Alternatively, the machine tool MC may have one non-machining axis of either the U axis or the W axis.

The functions included in the control devices 1 and 1A according to the first embodiment and the second embodiment can be realized by hardware, software, or combinations of hardware and software, respectively. Here, being realized by software indicates being realized by a computer reading and executing a program.

The components included in the control devices 1 and 1A can be realized by hardware including electronic circuits, and the like, software, or combinations of hardware, software.

The programs can be stored using various types of non-transitory computer readable media, and provided to a computer. The non-transitory computer readable media include various types of tangible storage media. Examples of non-transitory computer readable media include magnetic recording media (e.g., flexible disks, magnetic tapes, hard disk drives), magneto-optical media (e.g., magneto-optical disks), CD-ROM (Read Only Memory), CD-R, CD-R/W, semiconductor memory (e.g., mask ROM, PROM (Programmable ROM), EPROM (Erasable PROM), flash ROM, RAM). Furthermore, the programs may be provided to a computer by various types of transitory computer readable media. Examples of the transitory computer readable media include electric signals, optical signals, and electromagnetic waves. The transitory computer readable medium can provide programs to a computer through a wired communication path such as an electrical cable, optical fiber, or the like or a wireless communication path.

It should be noted that the step of writing programs to be recorded in a recording medium includes processing that is performed in a time series manner according to the order and processing that is performed in a parallel or independent manner, even if the processing is not necessarily performed in a time series manner.

In other words, the control device and the control method of the present disclosure can assume various embodiments having the following configurations.

(1) The control device 1 according to the present disclosure that controls each of a plurality of control axes included in an industrial machine based on a machining program, the control device 1 comprising: at least a program analysis unit 110; a program execution unit 120; and a servo control CPU 200, wherein the program analysis unit 110 includes: a machining/non-machining state determination unit 112 that determines whether a target block as an analysis target of the machining program 50 is in a machining state which causes the industrial machine to perform a machining operation, or in a non-machining state which causes the industrial machine to perform a non-machining operation other than machining, based on a state determination condition that is set in advance; a state storage unit 113 that stores a determination result determined by the machining/non-machining state determination unit 112; a switching necessity determination unit 114 that, in a case in which a state of the target block determined by the machining/non-machining state determination unit 112 is identical to a state of a block one before the target block stored in the state storage unit 113, determines that it is unnecessary to perform switching of a control target axis which is the control axis of a control target and/or switching of an electrical current control cycle with respect to the control target axis, and in a case in which the state of the target block is different from the state of the block one before the target block, determines that it is necessary to perform the switching of the control target axis and/or the electrical current control cycle; an information adding unit 115 that, in a case in which the switching necessity determination unit 114 determines that it is necessary to perform the switching, adds a switching request and information after switching indicating a state after switching to an analysis result of the target block; and an analysis result storage unit 116 that stores the analysis result, wherein the program execution unit 120 includes a switching execution unit 121 that executes the switching of the control target axis and/or the switching of the electrical current control cycle upon execution of the target block with respect to the servo control CPU 200 based on data of the control target axis and the electrical current control cycle in the machining state and the non-machining state, and the analysis result of the target block, and wherein the servo control CPU 200 controls the control target axis at the electrical current control cycle switched by the switching execution unit 121.

According to the control device 1, by automatically switching the control target axis and the electrical current control cycle, it is possible to suppress the maximum load of the servo control CPU 200, and thus it is possible to reduce the hardware cost of the servo control CPU 200.

(2) In the control device 1A according to (1) above, the control device 1A may further comprise a machining program look-ahead unit 101 that looks ahead a plurality of target blocks of the machining program 50, wherein the program analysis unit 110a may further include: a switching possibility determination unit 117 that determines whether it is possible to execute the switching of the control target axis or the switching of the electrical current control cycle in a block after the target block, in each of the plurality of target blocks looked ahead by the machining program look-ahead unit 101; and a switching execution block determination unit 118 that determines a block for executing the switching of the control target axis or the switching of the electrical current control cycle in the target block for which the switching necessity determination unit 114 determines that it is necessary to perform the switching based on a determination result by the switching possibility determination unit 117, wherein the information adding unit 115a may add the switching request and the information after switching with respect to the target block to the analysis result of the block determined by the switching execution block determination unit 118.

In this way, by executing the switching of the control target axis and the electrical current control cycle in a block before the target block, it is possible for the control device 1A to suppress an increase in the cycle time.

(3) In the control device (1, 1A) according to (1) or (2), wherein, in the state determination condition, either a machining axis or a non-machining axis may be set in advance for each of the plurality of control axes, and the state determination condition may include a condition for determining as being in the machining state in a case in which the target block includes a cutting feed command with respect to at least one machining axis, and determining as being in the non-machining state in a case in which the target block does not include the cutting feed command with respect to the machine axis.

In so doing, it is possible for the control devices 1 and 1A to automatically switch the control target axis and the electrical current control cycle with high accuracy.

(4) In the control device (1, 1A) according to (3), wherein either the machining axis or the non-machining axis is set for each of the plurality of control axes so that the cutting feed command with respect to the machining axis and a rapid traverse/cutting feed command with respect to the non-machining axis are not performed simultaneously.

In so doing, it is possible for the control devices 1 and 1A to automatically switch the control target axis and the electrical current control cycle with high accuracy.

(5) The control method according to the present disclosure for controlling each of a plurality of control axes in an industrial machine based on a machining program 50, the method being realized by a computer and comprising the steps of: at least performing program analysis; performing program execution; and performing servo control, wherein the performing program analysis includes: a machining/non-machining state determination step of determining whether a target block as an analysis target of the machining program is in a machining state which causes the industrial machine to perform a machining operation, or in a non-machining state which causes the industrial machine to perform a non-machining operation other than machining, based on a state determination condition that is set in advance; a state storage step of storing a determination result determined in the machining/non-machining state determination step; a switching necessity determination step of, in a case in which a state of the target block determined in the machining/non-machining state determination step is identical to a state of a block one before the target block stored in the state storage step, determining that it is unnecessary to perform switching of a control target axis which is the control axis of a control target and/or switching of an electrical current control cycle with respect to the control target axis, and in a case in which the state of the target block is different from the state of the block one before the target block, determining that it is necessary to perform the switching of the control target axis and/or the electrical current control cycle; an information adding step of, in a case in which the switching necessity determination step determines that it is necessary to perform the switching, adding a switching request and information after switching indicating a state after switching to an analysis result of the target block; and an analysis result storage step of storing the analysis result, wherein the program execution step includes a switching execution step of executing the switching of the control target axis and/or the switching of the electrical current control cycle upon execution of the target block based on data or the control target axis and the electrical current control cycle in the machining state and the non-machining state, and the analysis result of the target block, and wherein the servo control step controls the control target axis at the electrical current control cycle switched in the program execution step.

According to this control method, the same effect as (1) can be achieved.

EXPLANATION OF REFERENCE NUMERALS

1, 1A control device
100 numerical control CPU 110, 110a program analysis unit
111 state determination condition storage unit
112 machining/non-machining state determination unit
113 state storage unit
114 switching necessity determination unit
115, 115a information adding unit
116, 116a analysis result storage unit
117 switching possibility determination unit
118 switching execution block determination unit
200 servo control CPU

What is claimed is:

1. A control device that controls each of a plurality of control axes included in an industrial machine based on a machining program, the control device comprising:
at least a program analysis unit; a program execution unit; and a servo control unit,
wherein the program analysis unit includes:
a machining/non-machining state determination unit that determines whether a target block as an analysis target of the machining program is in a machining state which causes the industrial machine to perform a machining operation, or in a non-machining state which causes the industrial machine to perform a non-machining operation other than machining, based on a state determination condition that is set in advance;
a state storage unit that stores a determination result determined by the machining/non-machining state determination unit;
a switching necessity determination unit that, in a case in which a state of the target block determined by the machining/non-machining state determination unit is identical to a state of a block one before the target block stored in the state storage unit, determines that it is unnecessary to perform switching of a control target axis which is the control axis of a control target and/or switching of an electrical current control cycle with respect to the control target axis, and in a case in which the state of the target block is different from the state of the block one before the target block, determines that it is necessary to perform the switching of the control target axis and/or the electrical current control cycle;
an information adding unit that, in a case in which the switching necessity determination unit determines that it is necessary to perform the switching, adds a switching request and information after switching indicating a state after switching to an analysis result of the target block; and
an analysis result storage unit that stores the analysis result,
wherein the program execution unit includes a switching execution unit that executes the switching of the control target axis and/or the switching of the electrical current control cycle upon execution of the target block with respect to the servo control unit based on data of the control target axis and the electrical current control cycle in the machining state and the non-machining state, and the analysis result of the target block, and
wherein the servo control unit controls the control target axis at the electrical current control cycle switched by the switching execution unit.

2. The control device according to claim 1, further comprising a machining program look-ahead unit that looks ahead a plurality of target blocks of the machining program,
wherein the program analysis unit further includes:
a switching possibility determination unit that determines whether it is possible to execute the switching of the control target axis and/or the switching of the electrical current control cycle in a block after the target block, in each of the plurality of target blocks looked ahead by the machining program look-ahead unit; and
a switching execution block determination unit that determines a block for executing the switching of the control target axis and/or the switching of the electrical current control cycle the target block for which the switching necessity determination unit determines that it is necessary to perform the switching based on a determination result by the switching possibility determination unit,
wherein the information adding unit adds the switching request and the information after switching with respect to the target block to the analysis result of the block determined by the switching execution block determination unit.

3. The control device according to claim 1, wherein, in the state determination condition, either a machining axis or a non-machining axis is set in advance for each of the plurality of control axes, and the state determination condition includes a condition for determining as being in the machining state in a case in which the target block includes a cutting feed command with respect to at least one machining axis, and determining as being in the non-machining state in a case in which the target block does not include the cutting feed command with respect to the machine axis.

4. The control device according to claim 3, wherein either the machining axis or the non-machining axis is set for each of the plurality of control axes so that the cutting feed command with respect to the machining axis and a rapid traverse/cutting feed command with respect to the non-machining axis are not performed simultaneously.

5. A control method for controlling each of a plurality of control axes in an industrial machine based on a machining program, the method being realized a computer and comprising the steps of:
at least performing program analysis; performing program execution; and performing servo control,
wherein the performing program analysis includes:
a machining/non-machining state determination step of determining whether a target block as an analysis target of the machining program is in a machining state which causes the industrial machine to perform a machining operation, or in a non-machining state which causes the industrial machine to perform a non-machining operation other than machining, based on a state determination condition that is set in advance;
a state storage step of storing a determination result determined in the machining/non-machining state determination step;
a switching necessity determination step of, in a case in which a state of the target block determined in the machining/non-machining state determination step is identical to a state of a block one before the target block stored in the state storage step, determining that it is unnecessary to perform switching of a control target axis which is the control axis of a control target and/or switching of an electrical current control cycle with respect to the control target axis, and in a case in which the state of the target block is different from the state of the block one before the target block, determining that it is necessary to perform the switching of the control target axis and/or the electrical current control cycle;
an information adding step of, in a case in which the switching necessity determination step determines that it is necessary to perform the switching, adding a switching request and information after switching indicating a state after switching to an analysis result of the target block; and an analysis result storage step of storing the analysis result, wherein the program execution step includes a switching execution step of executing the switching of the control target axis and/or the switching of the electrical current control cycle upon execution of the target block based on data of the control target axis and the electrical current control cycle in the machining state and the non-machining state, and the analysis result of the target block, and wherein the servo control step controls the control target axis at the electrical current control cycle switched in the program execution step.

\* \* \* \* \*